United States Patent [19]

Ochiai

[11] Patent Number: 4,501,971
[45] Date of Patent: Feb. 26, 1985

[54] RADIOGRAPHIC INTENSIFYING SCREEN

[75] Inventor: Takeji Ochiai, Minamiashigara, Japan

[73] Assignee: Fuji Photo Film Co., Ltd., Kanagawa, Japan

[21] Appl. No.: 442,957

[22] Filed: Nov. 19, 1982

[30] Foreign Application Priority Data

Nov. 20, 1981 [JP] Japan .............................. 56-187502

[51] Int. Cl.³ .............................................. H01J 1/64
[52] U.S. Cl. .............................. 250/483.1; 250/488.1; 252/301.34; 252/301.35
[58] Field of Search .......................... 250/483.1, 488.1; 252/301.35, 301.34

[56] References Cited

U.S. PATENT DOCUMENTS 2,892,747  6/1959  Dye ........................................ 154/43
3,164,719  1/1965  Bauer ................................ 250/488.1

Primary Examiner—Alfred E. Smith
Assistant Examiner—Jack I. Berman
Attorney, Agent, or Firm—Gerald J. Ferguson, Jr.; Joseph J. Baker

[57] ABSTRACT

A radiographic intensifying screen comprising a substrate and a fluorescent layer provided thereon and consisting essentially of a binder and a radioluminescent phosphor dispersed therein. The binder comprises linear polyester resin or linear polyester resin crosslinked with a crosslinking agent. The screen exhibits improved physical properties.

3 Claims, No Drawings

RADIOGRAPHIC INTENSIFYING SCREEN

BACKGROUND OF THE INVENTION

1. Field of the Invention

This invention relates to a radiographic intensifying screen (hereinafter referred to as "intensifying screen"), and more particularly to an intensifying screen exhibiting improved physical properties in which a radioluminescent phosphor is dispersed in a binder comprising linear polyester resin or linear polyester resin crosslinked with a crosslinking agent to form a fluorescent layer.

2. Description of the Prior Art

In radiography such as medical radiography used for medical diagnosis and industrial radiography used for nondestructive inspection of industrial materials, an intensifying screen is used in face contact with a radiographic film to increase the sensitivity of the radiographing system.

The intensifying screen comprises a substrate and a fluorescent layer provided thereon. The fluorescent layer comprises a binder and a phosphor which emits light of high luminance by the excitation of radiation such as X-rays (radioluminescent phosphor) dispersed in the binder. Usually, the naked surface of the fluorescent layer is covered with a transparent protective layer. Some intensifying screens have a light-reflecting layer or a light-absorbing layer between the substrate and the fluorescent layer. Further, some intensifying screens used for nondestructive inspection of industrial materials have a metallic foil between the substrate and the fluorescent layer.

The intensifying screen having the above-mentioned structure is generally prepared by the following manufacturing process.

A radioluminescent phosphor is mixed with a binder in a suitable mixing ratio using a suitable solvent to prepare a dispersion in which the radioluminescent phosphor is dispersed in a solution of the binder. Then, the dispersion thus obtained is uniformly applied to a substrate by means of a doctor blade, a roll coater, a knife coater, or the like and dried to form a fluorescent layer. In the preparation of the intensifying screen having a light-reflecting layer, a light-absorbing layer or a metallic foil between the substrate and the fluorescent layer, the light-reflecting layer, the light-absorbing layer or the metallic foil is provided on the substrate beforehand, and then the dispersion is applied thereto and dried to form the fluorescent layer. After the formation of the fluorescent layer, a transparent protective layer for protecting the fluorescent layer is generally provided on the fluorescent layer. Unless otherwise indicated, the term "substrate" as used herein also means a substrate on one surface of which the light-reflecting layer, the light-absorbing layer or the metallic foil is provided beforehand.

From the viewpoint of practical use, it is desired for the intensifying screen to have a high flexing resistance and a high adhesion of fluorescent layer to substrate. That is, the fluorescent layer of the intensifying screen should not readily craze and peel off from the substrate when the panel is bent.

In the conventional intensifying screen, cellulose derivatives such as nitrocellulose and cellulose acetate have been practically used as the binder of the fluorescent layer of the screen. In the dispersion for forming the fluorescent layer of the intensifying screen prepared using cellulose derivative, the radioluminescent phosphor is dispersed uniformly. However, the intensifying screen prepared by using the dispersion exhibits low performance in flexing resistance and adhesive force of fluorescent layer to substrate. Accordingly, the fluorescent layer of the screen readily crazes and peels off from the substrate when the panel is bended.

As described above, the intensifying screen in which cellulose derivative is used as the binder of the fluorescent layer exhibits low performance in flexing resistance and adhesion of fluorescent layer to substrate. Accordingly, an intensifying screen exhibiting higher performance in flexing resistance and adhesion of fluorescent layer to substrate than the intensifying screen in which cellulose derivative is used as the binder of the fluorescent layer is desired.

SUMMARY OF THE INVENTION

In view of the above-mentioned circumstances, an object of the present invention is to provide an intensifying screen exhibiting higher performance in flexing resistance and adhesion of fluorescent layer to substrate than the intensifying screen in which cellulose derivative is used as the binder of the fluorescent layer.

In order to accomplish the above-mentioned object, the inventors of the present invention conducted various investigations in searching for a material suitable as the binder of the fluorescent layer of the intensifying screen. As a result of the investigations, it was found that an intensifying screen exhibiting higher performance in flexing resistance and adhesion of fluorescent layer to substrate than the intensifying screen in which cellulose derivative is used as the binder of the fluorescent layer can be obtained by using linear polyester resin as the binder of the fluorescent layer. Further, it was found that an intensifying screen generally exhibiting higher performance in flexing resistance and adhesion of fluorescent layer to substrate than the above-mentioned intensifying screen in which linear polyester resin is used as the binder of the fluorescent layer can be obtained by using linear polyester resin crosslinked with a crosslinking agent as the binder of the fluorescent layer. Furthermore, it was found that a dispersion for forming a fluorescent layer in which a radioluminescent phosphor is dispersed uniformly can be obtained by preparing a dispersion using as the binder a mixture of linear polyester resin and nitrocellulose, or a mixture of linear polyester resin crosslinked with crosslinking agent and nitrocellulose, and that the intensifying screen prepared by using the dispersion exhibits high performance in mechanical strength of edge faces of fluorescent layer in addition to high performance in flexing resistance and adhesion of fluorescent layer to substrate.

The first intensifying screen of the present invention comprises a substrate and a fluorescent layer provided on the substrate and consisting essentially of a binder and a radioluminescent phosphor dispersed therein, characterized in that the binder comprises linear polyester resin.

The second intensifying screen of the present invention comprises a substrate and a fluorescent layer provided on the substrate and consisting essentially of a binder and a radioluminescent phosphor dispersed therein, characterized in that the binder comprises linear polyester resin crosslinked with a crosslinking agent.

Among the binders employed in the present invention, the binder containing nitrocellulose together with linear polyester resin or with linear polyester resin crosslinked with a crosslinking agent is most preferable. As described above, in the intensifying screen manufacturing process, the binder provides a dispersion in which a radioluminescent phosphor is dispersed uniformly. Further, the intensifying screen in which the binder is employed in the fluorescent layer exhibits high performance in mechanical strength of edge faces of fluorescent layer in addition to high performance in flexing resistance and adhesion of fluorescent layer to substrate.

DETAILED DESCRIPTION OF THE INVENTION

The present invention will be described in detail hereinbelow.

Linear polyester resin employed as the binder of the fluorescent layer of the intensifying screen of the present invention has been well known. The resin can be obtained by polycondensation reaction of dihydroxy compound with dibasic acid or by polyaddition reaction of oxyacid.

Examples of the above-mentioned dihydroxy compound include ethylene glycol, 1,3-propanediol, 1,4-butanediol, 1,4-cyclohexanedimethanol, or the like. Further, examples of the above-mentioned dibasic acid include succinic acid, glutaric acid, adipic acid, terephthalic acid, isophthalic acid, or the like. Furthermore, examples of the above-mentioned oxyacid include glycolic acid, lactic acid, malic acid, tartaric acid, citric acid, salicylic acid, benzoic acid, gallic acid, mandelic acid, tropic acid, or the like.

Various linear polyester resins are commercially available. In the present invention, it is convenient to use these commercially available linear polyester resins. Examples of the commercially available linear polyester resins include Vylon 300, Vylon 500, Vylon 30P, Vylon 250, Vylon 90, Vylon 200, Vylon 103 (all manufactured by Toyobo Co., Ltd.), or the like.

The binder employed in the intensifying screen of the present invention may be linear polyester resin crosslinked with a crosslinking agent. Generally, the intensifying screen in which linear polyester resin crosslinked with a crosslinking agent is used as the binder exhibits higher performance in flexing resistance and adhesion of fluorescent layer to substrate than the intensifying screen in which linear polyester resin is used as the binder.

The crosslinking agent to crosslink the above linear polyester resin may be any compound provided the compound can crosslink the terminal hydroxy group of the linear polyester resin. In particular, diisocyanate should preferably be used as the crosslinking agent. Examples of the diisocyanate used as the crosslinking agent include polymethylene diisocyanate such as ethylene diisocyanate, trimethylene diisocyanate, tetramethylene diisocyanate, hexamethylene diisocyanate, or the like; aromatic diisocyanate such as p-phenylene diisocyanate, tolylene diisocyanate, p,p'-diphenylmethane diisocyanate, 1,5-naphthylene diisocyanate, or the like; m-xylylene diisocyanate, or the like. The amount of the crosslinking agent used is not particularly limited. In general, the amount of the crosslinking agent is within the range of 0.1 to 10 parts by weight, and preferably within the range of 1 to 4 parts by weight, per 100 parts by weight of the linear polyester resin.

The intensifying screen in which linear polyester resin or linear polyester resin crosslinked with a crosslinking agent is used as the binder exhibits higher performance in flexing resistance and adhesion of fluorescent layer to substrate than the intensifying screen in which cellulose derivative is used as the binder. However, the mechanical strength of the edge faces of the fluorescent layer of the former intensifying screen is lower than that of the latter intensifying screen, and the edge faces of the fluorescent layer of the former intensifying screen are easily damaged by the mechanical shock given thereon during the use of the screen. This is because linear polyester resin or linear polyester resin crosslinked with a crosslinking agent is more flexible than cellulose derivative.

Further, the dispersing property of the radioluminescent phosphor in the dispersion prepared by using linear polyester resin or by using linear polyester resin and a crosslinking agent is relatively low, and the dispersing property is lower than that of the radioluminescent phosphor in the dispersion prepared by using cellulose derivative.

The above-mentioned disadvantageous physical properties brought by the use of polyester resin or linear polyester resin crosslinked with a crosslinking agent as the binder can be reformed by using nitrocellulose together with linear polyester resin or with linear polyester resin crosslinked with a crosslinking agent as the binder. That is, an intensifying screen exhibiting high performance in mechanical strength of edge faces of fluorescent layer in addition to high performance in flexing resistance and adhesion of fluorescent layer to substrate can be obtained by using a mixture of linear polyester resin and nitrocellulose, or a mixture of linear polyester resin crosslinked with a crosslinking agent and nitrocellulose as the binder. Further, the dispersing property of the radioluminescent phosphor in the dispersion can be improved by using the mixture as the binder.

When nitrocellulose is used together with linear polyester resin or with linear polyester resin crosslinked with a crosslinking agent, the nitrocellulose should preferably have a nitration degree ranging from 10.7 to 12.2%, and more preferably have a nitration degree ranging from 11.5 to 12.2%. Further, the mixing weight ratio between the linear polyester resin and the nitrocellulose, or between the linear polyester resin crosslinked with a crosslinking agent and the nitrocellulose is generally within the range of 60:40 to 95:5, and should preferably be within the range of 80:20 to 95:5.

The intensifying screen of the present invention is prepared by the following manufacturing process.

A radioluminescent phosphor is mixed with the above-mentioned binder using a suitable solvent to prepare a dispersion in which the radioluminescent phosphor is dispersed in the binder. When linear polyester resin crosslinked with a crosslinking agent is used as the binder, the linear polyester resin and the crosslinking agent are mixed with the radioluminescent phosphor. Further, when nitrocellulose is used together with linear polyester resin or with linear polyester resin crosslinked with a crosslinking agent, the linear polyester resin and the nitrocellulose, or the linear polyester resin, the crosslinking agent and the nitrocellulose are mixed with the radioluminescent phosphor.

For example, as the above-mentioned solvent, there can be used alcohol such as methanol, ethanol, n-propanol, n-butanol, or the like; alkylene chloride such as methylene chloride, ethylene chloride, or the like; ketone such as acetone, methyl ethyl ketone, methyl isobutyl ketone, or the like; ester such as methyl acetate, ethyl acetate, butyl acetate, or the like; ether such as monoethyl ether and monomethyl ether of dioxane and ethylene glycol; and mixtures thereof.

For example, the radioluminescent phosphor employed in the present invention includes tungstate phosphor such as $CaWO_4$, $MgWO_4$, $CaWO_4$:Pb, or the like; terbium activated rare earth metal oxysulfide phosphor such as $Y_2O_2S$:Tb, $Gd_2O_2S$:Tb, $La_2O_2S$:Tb, $(Y,Gd)_2O_2S$:Tb, $(Y,Gd)_2O_2S$:Tb,Tm or the like; terbium activated rare earth metal phosphate phosphor such as $YPO_4$:Tb, $GdPO_4$:Tb, $LaPO_4$:Tb, or the like; terbium activated rare earth metal oxyhalide phosphor such as LaOBr:Tb, LaOBr:Tb,Tm, LaOCl:Tb, LaOCl:Tb,Tm, GdOBr:Tb, GdOCl:Tb, or the like; thulium activated rare earth metal oxyhalide phosphor such as LaOBr:Tm, LaOCl:Tm, or the like; barium sulfate phosphor such as $BaSO_4$:Pb, $BaSO_4$:$Eu^{2+}$,$(Ba,Sr)SO_4$:$Eu^{2+}$, or the like; divalent europium activated alkaline earth metal phosphate phosphor such as $Ba_3(PO_4)_2$:$Eu^{2+}$, $(Ba,Sr)_3(PO_4)_2$:$Eu^{2+}$, or the like; divalent europium activated alkaline earth metal fluorohalide phosphor such as $BaFCl$:$Eu^{2+}$, $BaFBr$:$Eu^{2+}$, $BaFCl$:$Eu^{2+}$,Tb, $BaFBr$:$Eu^{2+}$,Tb, $BaF_2.BaCl_2.KCl$:$Eu^{2+}$, $BaF_2.BaCl_2.BaSO_4.KCl$:$Eu^{2+}$, $(Ba,Mg)F_2.BaCl_2.KCl$:$Eu^{2+}$, or the like; iodide phosphor such as CsI:Na, CsI:Tl, NaI, KI:Tl, or the like; sulfide phosphor such as ZnS:Ag, (Zn,Cd)S:Ag, (Zn,Cd)S:Cu, (Zn,Cd)S:Cu,Al, or the like; hafnium phosphate phosphor such as $HfP_2O_7$:Cu; or the like. However, the radioluminescent phosphor which can be employed in the intensifying screen of the present invention is not limited to the above-mentioned phosphors, and any radioluminescent phosphor can be employed in the present invention.

The mixing weight ratio between the binder and the radioluminescent phosphor in the dispersion depends upon the kind of radioluminescent phosphor and so forth. In general, the mixing weight ratio between the binder and the radioluminescent phosphor is within the range of 1:200 to 1:10, and should preferably be within the range of 1:100 to 1:20.

Additives such as a dispersant for improving the dispersing property of the radioluminescent phosphor in the dispersion and a plasticizer for improving the bonding force between the binder and the radioluminescent phosphor in the fluorescent layer of the intensifying screen to be obtained may be contained in the dispersion. For example, as the above-mentioned dispersant, there can be used phthalic acid, stearic acid, caproic acid, lipophilic surfactants, or the like. As the above-mentioned plasticizer, there can be used phosphate ester such as triphenyl phosphate, tricresyl phosphate, diphenyl phosphate, or the like; phthalate ester such as diethyl phthalate and dimethoxyethyl phthalate; glycolate ester such as ethyl phthalyl ethyl glycolate and butyl phthalyl butyl glycolate; or the like.

Then, the above-mentioned dispersion is uniformly applied to a substrate by means of a doctor blade, a roll coater, a knife coater, or the like to form a coating of the dispersion thereon. For example, as the substrate, there can be used ordinary paper; processed paper such as baryta paper, resin-coated paper, pigment containing paper which contains a pigment such as titanium dioxide, sized paper which is sized with polyvinyl alcohol, or the like; sheet of macromolecular material such as polyethylene, polypropylene, polyester such as polyethylene terephthalate, or the like; and metallic sheet such as aluminum foil, aluminum alloy foil, or the like.

The surface of the substrate to which the dispersion is applied may be processed beforehand, for example, by applying thereto gelatin. Further, when the intensifying screen having a light-reflecting layer for improving the sensitivity of the intensifying screen, a light-absorbing layer for improving the sharpness of the intensifying screen or a metallic foil for removing a scattering radiation is manufactured, the light-reflecting layer, the light-absorbing layer or the metallic foil is provided on the above-mentioned substrate beforehand, and then the composite obtained is used as a "substrate". In this case, it is needless to say that the dispersion is applied to the light-reflecting layer, the light-absorbing layer or the metallic foil.

The light-reflecting layer can be provided on the substrate by vacuum deposition of a metal such as aluminum, lamination of a metallic foil such as an aluminum foil, or application of a dispersion which comprises a binder and a white powder such as titanium dioxide, aluminum oxide barium sulfate, or the like dispersed therein. (The binder employed in this dispersion may be the same as employed in the fluorescent layer.) The light-absorbing layer can be provided on the substrate by application of a dispersion which comprises a binder and carbon black or a colorant such as chromium yellow, oil yellow and Zapon fast yellow dispersed in the binder. (The binder employed in this dispersion may be the same as employed in the fluorescent layer.) The metallic foil can be provided on the substrate by lamination of a radiation-absorptive metallic foil such as a lead foil, a lead alloy foil, a tin foil, or the like.

After the formation of the coating of the dispersion, the coating is heated and dried to form a fluorescent layer on the substrate. When the binder in the fluorescent layer to be formed comprises linear polyester resin crosslinked with a crosslinking agent, the linear polyester resin crosslinked with a crosslinking agent is produced during the heating by the reaction of the linear polyester resin contained in the coating with the crosslinking agent also contained therein. The thickness of the fluorescent layer is properly determined depending on the kind of radioluminescent phosphor, the mixing ratio between the binder and the radioluminescent phosphor and so forth. In general, the thickness of the fluorescent layer is within the range of 20 $\mu$m to 1 mm, and preferably within the range of 100 to 500 $\mu$m.

In the intensifying screen of the present invention, a transparent protective layer for physically and chemically protecting the fluorescent layer is generally provided on the naked surface of the fluorescent layer (the side opposite to the substrate). For example, the transparent protective layer can be provided on the fluorescent layer by dissolving a resin such as cellulose derivative such as cellulose acetate and nitrocellulose, polymethyl methacrylate, polyvinyl butyral, polyvinyl formal, polycarbonate, polyvinyl acetate, vinyl chloride-vinyl acetate copolymer or the like in a suitable solvent to prepare a solution of the resin, applying the solution to the naked surface of the fluorescent layer, and then drying the coating of the solution. Alternatively, the transparent protective layer can be provided thereon by bonding thereto a thin film such as polyethylene terephthalate film, polyethylene film, vinylidene chloride film, nylon film, or the like with a suitable adhesive. The thickness of the transparent protective layer should preferably be within the range of 3 to 20 $\mu$m.

As shown in the example described below, the intensifying screen of the present invention exhibits higher performance in flexing resistance and adhesion of fluorescent layer to substrate than the intensifying screen in which cellulose derivative is used as the binder. In particular, the intensifying screen of the present invention in which the mixture of linear polyester resin and nitrocellulose or the mixture of linear polyester resin crosslinked with a crosslinking agent and nitrocellulose is used as the binder exhibits high performance in mechanical strength of edge faces of fluorescent layer in addition to high performance in flexing resistance and adhesion of fluorescent layer to substrate. Further, when the mixture of linear polyester resin and nitrocellulose, or the mixture of linear polyester resin crosslinked with a crosslinking agent and nitrocellulose is used as the binder, a dispersion for forming a fluorescent layer in which radioluminescent phosphor is dispersed uniformly can be obtained in the preparation of the intensifying screen.

The present invention will hereinbelow be described referring to the following example.

EXAMPLE

Calcium tungstate phosphor (CaWO$_4$) was prepared. The particles having a particle size not less than 15 μm contained in the CaWO$_4$ phosphor were removed by classification. On the one hand, linear polyester resin (a mixture of Vylon 500 and Vylon 200 in a mixing weight ratio of 17:3) was prepared.

Then, 144 parts by weight of the linear polyester resin (45 parts by weight of resin content) were added to 500 parts by weight of the classified CaWO$_4$ phosphor to obtain a suspension, and then 55 parts by weight of methyl ethyl ketone were added to the suspension to wet the suspension. Thereafter, 1.3 parts by weight of tolylene diisocyanate and 66.7 parts by weight of nitrocellulose having a nitration degree of 11.5% (5 parts by weight of resin content) were added to the wet suspension and mixed therewith by hand stirring. Further, to the resultant, 0.5 parts by weight of tricresyl phosphate, 5.7 parts by weight of n-butanol and 20 parts by weight of methyl ethyl ketone were added and mixed therewith thoroughly by means of a propeller mixer to prepare a dispersion having a viscosity ranging from 25 to 35 ps at 25° C. in which the CaWO$_4$ phosphor is dispersed uniformly. The dispersion thus obtained was designated "Dispersion No. 1". As is clear from the above, the composition of Dispersion No. 1 was as follows.

| | |
|---|---|
| CaWO$_4$ phosphor | 500 parts by weight |
| Linear polyester resin | 45 parts by weight |
| Tolylene diisocyanate | 1.3 parts by weight |
| Nitrocellulose | 5.0 parts by weight |
| Tricresyl phosphate | 0.5 parts by weight |
| n-Butanol | 5.7 parts by weight |
| Methyl ethyl ketone | 75 parts by weight |

Then, Dispersion No. 1 was uniformly applied to a carbon-incorporated polyethylene terephthalate sheet having a thickness of 250 μm (substrate) which was placed on a glass plate positioned horizontally by means of a doctor blade to form a coating of the dispersion. Thereafter, the coating was dried at room temperature for 30 minutes under windless condition and then, further dried at a temperature of 90° C. for 10 minutes under the condition of a wind velocity of 0.2 m/sec to form a fluorescent layer having a thickness of 200 μm on the substrate. The intensifying screen thus obtained was designated "Screen No. 1".

Separately, Dispersions No. 2, No. 3, No. 4 and No. 5 having the composition shown in Table 1 below were prepared in the same manner as mentioned above, and Screens No. 2, No. 3, No. 4 and No. 5 having a fluorescent layer of almost the same thickness as the fluorescent layer of Screen No. 1 were manufactured in the same manner as mentioned above using Dispersions No. 2, No. 3, No. 4 and No. 5, respectively. Screen No. 5 was manufactured as a reference. The amount of each constituent of the compositions shown in Table 1 below is expressed on part by weight basis.

TABLE 1

| Dispersion No. | CaWO$_4$ Phosphor | *Linear Polyester Resin | Tolylene Diisocyanate | Nitrocellulose | Tricresyl Phosphate | n-Butanol | Methyl Ethyl Ketone |
|---|---|---|---|---|---|---|---|
| 1 | 500 | 45 | 1.3 | 5 | 0.5 | 5.7 | 75 |
| 2 | 500 | 45 | 1.3 | — | 0.5 | 5.7 | 75 |
| 3 | 500 | 45 | — | 5 | 0.5 | 5.7 | 75 |
| 4 | 500 | 45 | — | — | 0.5 | 5.7 | 75 |
| 5 | 500 | — | — | 28.1 | 0.5 | 5.7 | 75 |

*A mixture of Vylon 500 and Vylon 200 (both manufactured by Toyobo Co., Ltd.) in a mixing weight ratio of 17:3.

Then, the flexing resistance, adhesion of fluorescent layer to substrate, and mechanical strength of edge faces of fluorescent layer of Screens No. 1 to No. 5 were evaluated. The dispersing property of the radioluminescent phosphor (CaWO$_4$ phosphor) in Dispersions No. 1 to No. 5 was also evaluated. The results are shown in Table 2 below. The evaluation of the above-mentioned physical properties was conducted by the following testings.

(1) Testing of flexing resistance

A rectangular test piece of intensifying screen having a width of 30 mm and a length of 50 mm was positioned so that the fluorescent layer thereof faced upwards. The lengthwise half of the test piece was fixed with a stainless steel clamp plate, and the unfixed portion of the test piece was gradually bent. When craze arose in the fluorescent layer, the angle θ between the clamp plate and the bended test piece was measured by a protractor. A larger θ value means a higher flexing resistance. In Table 2 below, the flexing resistance of Screens No. 1 to No. 5 is evaluated with the three ranks of X, Δ and O. The marks X, Δ and O represent θ values within the ranges of $0° < \theta \leq 50°$, $50° < \theta \leq 90°$ and $90° < \theta 180°$, respectively.

(2) Testing of adhesion of fluorescent layer to substrate

A rectangular test piece of intensifying screen having a width of 10 mm and a length of 60 mm was prepared, and the fluorescent layer of the test piece was backed up with an adhesive polyester tape by applying thereto the tape. Then, the fluorescent layer backed up with the adhesive polyester tape was caused to peel off from the substrate in length of 10 mm to the lengthwise direction of the test piece. Thereafter, the separated fluorescent layer and substrate were pulled to opposite directions by means of Tensilon (UTM-11-20, manufactured by Toyo Baldwin Co., Ltd.) at a pulling rate of 20 mm/min. The force F (gram) needed to cause the fluorescent layer to peel off from the substrate in length of 10 mm was measured. A larger F value means a higher adhesion of fluorescent layer to substrate. In Table 2 below, the adhesion of fluorescent layer to substrate in Screens No. 1 to No. 5 is evaluated with the three ranks of X, Δ and O. The marks X, Δ and O represent F values within the ranges of 0 gram$<F\leq 50$ grams, 50 grams$<F\leq 100$ grams and 100 grams$<F$, respectively.

(3) Testing of mechanical strength of edge faces of fluorescent layer

A square test piece of intensifying screen having a size of 150 mm×150 mm in one portion of which the fluorescent layer is removed from the substrate and the substrate is exposed was prepared. A stainless steel plate having an edge of a thickness of 0.5 mm and a width of 15 mm was caused to impinge upon the exposed section of the fluorescent layer perpendicularly thereto at a speed of 60 mm/min so that a force of 750 grams was exerted to the portion upon which the edge of the stainless steel plate impinged. Then, the length t (mm) of the crack which arose in the fluorescent layer and extended toward the same direction as of the movement of the stainless steel plate was measured by a slide gauge. A larger t value means a lower mechanical strength of edge faces of fluorescent layer. In Table 2 below, the mechanical strength of edge faces of fluorescent layer of Screens No. 1 to No. 3 is evaluated with the three ranks of X, Δ and O. The marks X, Δ and O represent t values within the ranges of 10 mm$<t$, 2 mm$<t\leq 10$ mm and 0 mm$<t\leq 2$ mm, respectively.

(4) Testing of dispersing property of radioluminescent phosphor in dispersion

A dispersion was applied to a grind gauge, and the grind gauge value l (μ) of the dispersion was measured using a stainless steel blade. A larger l value means a lower dispersing property of radioluminescent phosphor in dispersion. In Table 2 below, the dispersing property of the radioluminescent phosphor contained in Dispersions No. 1 to No. 5 is evaluated with three ranks of X, Δ and O. The marks X, Δ and O represent l values within the ranges of 30μ$<l$, 15μ$<l\leq 30\mu$ and 0μ$<l<15\mu$, respectively.

In the following Table 2, the parenthesized values are measured value.

binder of the fluorescent layer (Screen No. 5). Among the intensifying screens of the present invention, the intensifying screens in which the binder comprising linear polyester resin crosslinked with a crosslinking agent is used (Screens No. 1 and No. 2) exhibit higher performance in flexing resistance and adhesion of fluorescent layer to substrate than the intensifying screen in which the binder comprising linear polyester resin is used (Screens No. 3 and No. 4). Further, among the intensifying screens of the present invention, the intensifying screen in which the binder consisting solely of linear polyester resin is used (Screen No. 4) and the intensifying screen in which the binder consisting solely of linear polyester resin crosslinked with a crosslinking agent is used (Screen No. 2) exhibit low performance in mechanical strength of edge faces of fluorescent layer, and the mechanical strength of the edge faces of the fluorescent layer of these screens is remarkably lower than that of the intensifying screen in which nitrocellulose is used as the binder (Screen No. 5). However, in the intensifying screen in which nitrocellulose is used together with linear polyester resin as the binder (Screen No. 3) and the intensifying screen in which nitrocellulose is used together with linear polyester resin crosslinked with a crosslinking agent as the binder (Screen No. 1), the performance in mechanical strength of edge faces of fluorescent layer is remarkably improved. That is, the use of nitrocellulose together with linear polyester resin or with linear polyester resin crosslinked with a crosslinking agent is effective to remarkably improve the performance in mechanical strength of edge faces of fluorescent layer without particularly lowering the performance in flexing resistance and adhesion of fluorescent layer to substrate. (Screen No. 1 exhibits higher performance in adhesion of fluorescent layer to substrate than Screen No. 2). Further, the dispersion prepared using linear polyester resin (Dispersion No. 4) and the dispersion prepared using linear polyester and a crosslinking agent (Dispersion No. 2) exhibit low performance in dispersing property of radioluminescent phosphor, and the dispersing property of the radioluminescent phosphor in these dispersions is lower than that of the radioluminescent phosphor in the dispersion prepared using nitrocellulose (Dispersion No. 5). However, in the dispersion prepared using nitrocellulose together with linear polyester resin (Dispersion No. 3) and the dispersion prepared using nitrocellulose together with linear polyester resin and a crosslinking agent (Dispersion No. 1), the performance in dispersing property of radioluminescent phosphor is remarkably improved. That is, the use of nitrocellulose together with linear polyester resin or with

TABLE 2

| Screen and Dispersion No. | Flexing Resistance (°) | Adhesion of Fluorescent Layer to Substrate (g/10 mm) | Mechanical Strength of Edge Faces of Fluorescent Layer (mm) | Dispersing Property of Radioluminescent Phosphor (μ) |
|---|---|---|---|---|
| 1 | o (180) | o (250) | o (0.5) | o (8) |
| 2 | o (250) | o (200) | x (10) | x (35) |
| 3 | Δ (90) | Δ (90) | o (1) | o (9) |
| 4 | o (230) | o (210) | Δ (3) | x (42) |
| 5 | x (40) | x (30) | o (1) | o (8) |

As is clear from the above Tables 1 and 2, the intensifying screens of the present invention (Screens No. 1 to No. 4) exhibit higher performance in flexing resistance and adhesion of fluorescent layer to substrate than the intensifying screen in which nitrocellulose is used as the linear polyester and a crosslinking agent is effective to remarkably improve the performance in dispersing property of radioluminescent phosphor.

I claim:

1. A radiographic intensifying screen comprising a substrate and a fluorescent layer provided on said substrate and consisting essentially of a binder and a radioluminescent phosphor dispersed therein, said binder comprising linear polyester resin and nitrocellulose.

2. A radiographic intensifying screen comprising a substrate and a fluorescent layer provided on said substrate and consisting essentially of a binder and a radioluminescent phosphor dispersed therein, said binder comprising nitrocellulose and linear polyester resin crosslinked with a crosslinking agent.

3. A radiographic intensifying screen as claimed in claim 2, wherein said crosslinking agent is diisocyanate.

* * * * *